United States Patent
Axelrod

[15] 3,658,420
[45] Apr. 25, 1972

[54] PHOTOMASK INSPECTION BY SPATIAL FILTERING

[72] Inventor: Norman N. Axelrod, Summit, N.J.
[73] Assignee: Bell Telephone Laboratories, Incorporated, Murray Hill, N.J.
[22] Filed: Dec. 10, 1969
[21] Appl. No.: 883,957

[52] U.S. Cl. ................................356/71, 350/3.5, 350/162, 356/200, 356/237, 356/239
[51] Int. Cl. ................G06k 9/08, G01n 21/16, G01n 21/32
[58] Field of Search ..........................356/239, 237, 71, 200; 350/3.5, 162

[56] References Cited

UNITED STATES PATENTS

| | | | |
|---|---|---|---|
| 3,240,108 | 3/1966 | Lehan et al. | 350/162 SF |
| 3,370,268 | 2/1968 | Dobrin et al. | 350/162 SF |
| 3,519,331 | 7/1970 | Cutrona et al. | 350/162 SF |

OTHER PUBLICATIONS

Montgomery, et al., " Spatial Filtering" S.O.S.A., V.52, No. 11, pp. 1,259– 1,275, November, 1962.
Kozma, et al., " Spatial Filtering . . ." Applied Optics, V.4, No. 4, pp. 387– 392, April, 1965.
Lohmann, et al., " Computer Generated Spatial Filters . . ." Applied Optics, V.7, No. 4, pp. 651– 655, April, 1968.

Primary Examiner—Ronald L. Wibert
Assistant Examiner—Warren A. Sklar
Attorney—R. J. Guenther and Edwin B. Cave

[57] ABSTRACT

This disclosure describes an optical spatial filtering technique for detecting hole-type defects and excess spot defects in photomasks used in making microcircuits. An approximate form factor intensity filter provides suppression of the regularly shaped mask features. For masks with features whose boundaries are along only the X–Y direction, this filter advantageously is a cross placed in the transform plane. With rectangular features suppressed, only nonrectangular defect data passes. Spots as small as 0.1 mil are detected and displayed on a TV monitor; or, using a photomultiplier tube, signals are stored on an oscilloscope or by a recorder for analysis, or counted with a pulse counter. Masks or circuits on opaque substrates are also inspected by this method.

3 Claims, 4 Drawing Figures

PATENTED APR 25 1972

3,658,420

INVENTOR
N.N. AXELROD
BY Charles E. Graves

ATTORNEY

3,658,420

PHOTOMASK INSPECTION BY SPATIAL FILTERING

FIELD OF THE INVENTION

This invention relates to photolithography for integrated circuits and, more particularly, to the inspection of photomasks to detect defects in the form of extra spots or holes.

BACKGROUND OF THE INVENTION

Detecting defects in complicated masks containing details of 600 circuits with definition down to tenths of a mil has heretofore involved exacting and time-consuming procedures. One approach is to inspect sample circuits on each mask using an optical microscope. This is highly inefficient, however, and the results are necessarily uncertain.

Applicant's colleague, L. S. Watkins, in his patent application, Ser. No. 858,002, filed Sept. 15, 1969, assigned to Western Electric Company, which is part owner of applicant's assignee Bell Laboratories, recognizes the desirability for inspection purposes of passing the signal from the defects while suppressing the "noise", the latter being signals tracing to mask features wanted for photolithography. Watkins employs an optical system with an intensity filter in the transform plane which blocks spatial frequencies corresponding to the periodicity of the mask. The method's advantages are the imaging of defect information only, detection of errors in periodicity such as step-and-repeat errors, and coverage of fairly large areas in one inspection step.

The scheme, however, also contains a number of practical drawbacks. For one, optical alignment of the mask with the spatial filter is difficult. Further, the process tends to generate defect images for which there are no corresponding mask defects. Also, the filtering scheme requires that at least 10 or so circuits be illuminated to obtain information on a single circuit or fraction thereof. Considerable "background light" is thus generated due to scattering from imperfections and dust in the optical system and to reflections from surfaces, all of which generate noise in the optical signal. Discerning a genuine defect on a TV monitor or processing the information in the presence of this scattered light or noise can be impossible if the noise level is sufficiently high.

The following, then are important objects of the present invention:
 to facilitate photomask inspection;
 to correctly identify by optical means photomask defects without also construing correctly formed features as defective;
 to illuminate only the mask portion being inspected;
 to reduce the problems of delicate alignment of numerous components; and
 to further reduce the redundancy of the optical signal under scrutiny.

SUMMARY OF THE INVENTION

The present invention is based in part on applicant's recognition of the advantages of using a "form factor" intensity filter in the inspection of photomasks by optical spatial filtering.

The relative energy in a diffraction pattern is given by the product of a factor, called the structure factor, which depends solely on the arrangement and spacing of the identical individual apertures or diffracting elements; and a second factor, called the form factor, which depends solely on the shape of the details in the individual aperture of diffracting elements. A relevant discussion of these considerations may be found at page 202 et seq. of Light by R. W. Ditchburn, 1963, John Wiley and Sons, Inc. which is hereby incorporated by reference.

Features in current photomasks are almost invariably rectilinear motifs or outlines. These and simple curvilinear motifs comprise a class of shapes known as geometric. The appropriately approximated spatial filter to block diffraction energy tracing to simple geometric shapes is itself a simple geometric shape.

Thus, in one embodiment, a cross-shaped stop filter is employed in the transform plane of an optical imaging system to block signals arising from the X–Y shape of mask features. Since the form function of defect geometry is nearly always nonrectangular, defect signals are transmitted around the stop filter, and hence are passed and suitably detected thereafter. If the predominant mask geometric characteristic were circularity, the stop filter is in the shape of a circle.

The reason for choosing an opaque cross shape as a spatial filter to block signals arising from the X–Y shape of mask features is because the diffraction energy which traces to the X–Y mask features is itself in the shape of a cross. As will be explained below, the cross shape may consist of struts whose ends are tapered either continuously or in a terraced or stepped fashion.

In general, the selection of a particular shape of spatial filter is done by blocking out light eminating from the predominant geometric characteristics of the work to be inspected. The spatial extent, or area, of the light in the Fourier transform plane will be determined by the diffraction pattern (i.e., the Fourier transform) of the narrowest line elements of the mask. All additional information on larger mask features (which by definition are generally rectangular), as well as the periodicity from mask circuit to mask circuit, is contained in the said area in the Fourier transform.

In a particular inventive embodiment, coherent light from a helium neon laser is focused and passed through a pinhole and thereafter through a collimating lens. Then this parallel beam passes through a small rectangular slit to assure illumination of only that mask portion under inspection. This expedient reduces scattered light, permits scanning, and increases the signal-to-noise ratio. The parallel beam in contacting the mask portion is diffracted into different angles depending upon the spatial frequencies of the mask; and the diffracted light is focused at the diffraction or transform plane. The cross-shaped spatial filter is rotatable into and out of the beam in this plane. The unblocked signal is then reconstituted and magnified for inspection by a TV camera and monitor system.

Advantageously, for scanning purposes, the mask is mounted on an arm which is connected to a step-and-repeat drive. The mask holder on the arm can be rotated to align the mask with the drive direction.

Alternatively, the spatially filtered reconstituted image of defect data is directed through a photomultiplier tube connected to a storage oscilloscope, the sweep of which is triggered by starting the drive on the step-and-repeat motor on the mask mounting arm.

The invention and its further objects, features, and advantages will be more clearly recognized from a reading of the description to follow of an illustrative embodiment thereof.

THE DRAWING

DETAILED DESCRIPTION OF AN ILLUSTRATIVE EMBODIMENT

An appreciation of applicant's invention will be aided by first considering the aforementioned method of Watkins. There, an intensity filter, typically comprising opaque circular dots with 0.8-mil diameters in a rectangular array of 1.6-mil spacing, is placed in the diffraction plane in an optical system generally corresponding to that of applicant's FIG. 1. The dot spacing is derived from the typical periodic distance between corresponding detail in the mask. After the lenses are correctly placed, and the laser beam mirrors, expander and pinhole are properly arranged, the spots from the mask diffraction pattern are aligned with the 1.6-mil dot separation in the spatial filter for 62-mil step-and-repeat pattern on the mask. The referred-to pattern results from reproducing on the mask an X–Y array of identical circuit elements at a fixed center-to-center spacing. The mentioned periodic distance between corresponding detail in the mask thus is the same as the center-to-center spacing achieved by the conventional step-and-repeat operations. It thus is necessary to effect a very fine angular mask adjustment, as well as X–Y alignment to small fractions of 1.0 mil. Further, the filter requires adjusting along the optical axis.

Figure 1:
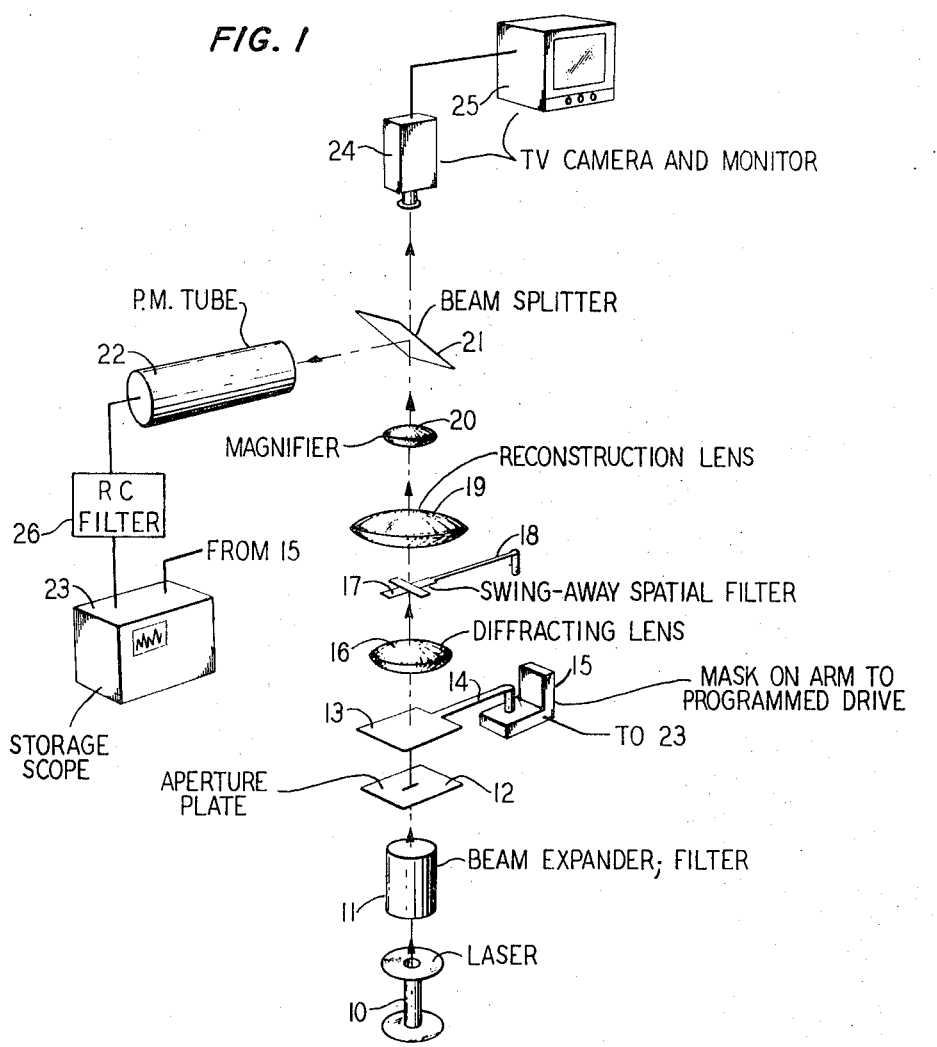
FIG. 1 is an optical system in schematic form embodying the invention.

The present invention avoids these alignment problems, and the others earlier mentioned, by using a form factor intensity filter. Referring to FIG. 1, light from a coherent source such as the He-Ne laser 10 is directed through a pinhole filter beam expander 11 which both smoothes spatial nonuniformities of intensity and collimates the beam to a useful diameter. The beam then passes through an aperture in the form of a small rectangular slit 12, typical dimensions of which are 6 by 50 mil. Advantageously, the aperture plate is rotatable and translatable in a plane normal to the optical path. The mask 13 is suitably held by an arm 14 (shown only schematically) that is connected to a step-and-repeat drive 15. Arm 14 also has the capability of rotatably orienting the mask 13 in a plane normal to the light path. Slit 12 reduces the scattered light and therefore increases the signal-to-noise ratio. Further, movement of the mask across the slit 12 permits scanning of the mask.

The light beam is diffracted by the mask 13; and the diffracted light is focused by lens 16 at the diffraction plane, at which the invention's form factor spatial filter 17 is located. Filter 17 is a stop in the shape of a cross, the strut dimensions of which are typically ½-inch wide by 3 inches for 0.4-mil line detail with a diffracting lens of 4-inch focal length. Filter 17 is mounted on arm 18 for movement into and out of the diffracted light beam. The filtered image is reconstituted by lens 19 and thereafter magnified by lens 20.

Beyond lens 20 a beam splitter 21 is advantageously placed to permit directing of some beam energy to a photomultiplier tube 22 which feeds a storage oscilloscope 23. When the step-and-repeat motor of the drive 15 is started, a signal from the latter is sent to trigger the oscilloscope sweep. The remaining beam energy is monitored directly with a television camera 24 feeding a monitor 25.

The area of illumination on the mask is defined by the slit 12 dimensions. The exemplary 6- by 50-mil slit has been determined to permit signal-to-noise ratio improvement to where the photomultiplier signal recorded on storage oscilloscope 23 indicates mask defects when the mask is mechanically moved in front of the slit.

Using the above-described scheme, without the aperture plate, visual identification was made with TV monitor 25, and also by separate optical microscope inspection, of defects as small as 0.1 in static or non-moving images. Photoelectric detection with the aperture plate of defects in traveling images during scanning was also made. With monitor 25 showing such a defect signal, the swept voltage deflection of a single horizontal line displayed on monitor 25 gave a measurable signal; and patterns with circles have been successfully filtered.

This invention also provides a preferred way to inspect used masks, by uniquely exploiting the manner in which wear occurs. Deterioration of masks is principally caused by scratching of the mask surface by sharp contours of the silicon surfaces which it has contacted. As this scratching is statistically distributed, more of it occurs in large areas which are not being used in the printing during photolithography than in the smaller percentage of area used to store the information. Thus, total scattering from the large areas provides a useful secondary standard of wear. This particular scattering is evidenced as higher outputs from the photomultiplier tube 22, using the described inventive scheme.

Figure 2:
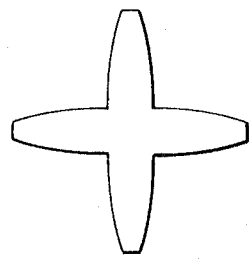
FIG. 2 and FIG. 3 are schematic diagrams of alternate form factor spatial filters for rectangular mask detail.
Figure 3:
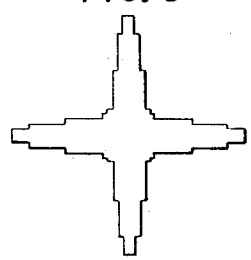

The superposition in the diffraction plane of the form factors from the total of rectangular mask detail is approximately in the shape of a cross; hence filter 17 is referred to as an approximate form factor spatial filter. A solid cross composed of rectangular struts is such an approximation. The particular shape of the filter 17, once scattering and reflection are reduced to the extent possible, determines the S/N ratio. The latter as used herein is defined as the ratio of the defect signal at the photomultiplier tube to the signal from all other causes. For example, it will be recognized that it may be more optically efficient to use struts which are tapered either in a continuous fashion such as depicted in FIG. 2 or terraced as in FIG. 3. The better the optical aspect is optimized, however, the greater is the precision necessary to align filter 17. In practicing this invention, however, the optical aspect need only be optimized to about 1 mm, in contrast to the Watkins procedure, where without a liquid gate, alignment to less than 1 mil is necessary.

Pursuant to a further aspect of the invention, scattered light affecting the photomultiplier signal is reduced by a factor of 5 to 10 by tilting the mask so that the reflections from the mask propagate away from the signal collecting lenses in the system. In this way, reflections from the lenses onto the mask are removed from the optical system.

Advantageously, time-dependent noise in the photomultiplier signal is reduced by use of RC filter 26 across the oscilloscope input. The choice of the RC time constant depends upon the width of the aperture 12 and upon the scanning rate. Movement is at a rate typically of about 6 seconds per inch, or 36 milliseconds per 6 mils. The required RC time constant using a 6-mil wide illuminating slot accordingly is about 10 milliseconds.

The following applies to the inventive system's resolution, detectability, and sensitivity. For scanning with a photomultiplier tube, the location of a small defect can be determined to less than the width of the slit 12 used to define the illuminated area. For visual observation with monitor 25, it is the number of lines on the TV screen which determines what can be seen. A well focused 50-mil pattern on a 500-line screen amounts only to 0.1-mil of pattern data per line. However, with the present spatial filter in the optical system, the image of a 0.1-mil defect is substantially expanded so that the visual detection of a defect is better than the optical resolution of the TV. It is, of course, detection which is the important function. Thus, an unfiltered 0.1-mil spot was not seen on the monitor, while its filtered image was.

Defects larger than 0.6 mil are photoelectrically detected with this optical system because the edges of typical defects are not smooth, but have fine detail. The result is extended diffraction patterns that are passed by filter 17.

In summary, the use of approximate form factor spatial filtering of the present invention has several advantages:

a. The alignment of the diffraction pattern and the spatial filter 17 is trivial.
b. The background scattered light is reduced by one to three orders of magnitude since only the mask area under inspection need be illuminated.
No ghosts have been observed.
d. The method is applicable to substantially any aperiodic patterns of regular shape.
e. Its usage is simple in that filter construction is simple, the filter is independent of the step-and-repeat distance, and it is simple to determine whether a defect is in a critical location on the mask.
f. The lens requirements are lessened.
g. An automatic scan is possible.

Furthermore, the technique is applicable to some forms of completed circuits on opaque substrates, as well as photomasks. The optics is altered so that the diffraction takes place in reflection rather than in transmission.

Numerous adaptations of the scheme's inventive principle are readily seen. For example, form factor filtered images will still be realized with the slit in the aperture plate enlarged severalfold. The resulting electrical signal from an image tube is then advantageously analyzed for defects by some suitable image analyzer which electronically makes quantative assessments of the projected filtered defect features.

Figure 4:
FIG. 4 is an alternate aperture plate.

Additionally, an aperture plate with two apertures 12a, 12b, such as depicted in FIG. 4, provides an advantage when substituted for the single aperture plate in FIG. 1. The two apertures 12a, 12b are arranged to cover, during scanning, the corresponding parts of adjacent circuits. The filtered image of corresponding parts is passed, via beam splitter 21 as suitably adapted, to two photodetectors, not shown. The output of the latter is fed to a difference amplifier to subtract out the periodic background signal, leaving only defect signal if present.

The spirit of the invention is embraced in the claims to follow.

What is claimed is:

1. Method for detecting defects in a photomask consisting of supposedly identical circuit elements having rectilinear geometry and located at fixed center-to-center spacing in an X-Y array, comprising the steps of:

projecting a coherent collimated light beam through a rectangular slit in an opaque aperture plate and onto one or more of said circuit elements;

with a transform lens, focusing the light transmitted through said mask in the transform plane of said lens;

in said transform plane, interposing a spatial stop filter in the form of a cross consisting of a pair of opaque rectangular struts disposed substantially at right angles to each other, thereby to block the light diffracted by the characteristic rectilinearity of said one or more elements, but to pass the light tracing to nonrectilinear defects in said elements;

detecting said passed light to produce an output; and utilizing said output to generate indicia of defects in said mask.

2. Method pursuant to claim 1, comprising the further step of mechanically moving said mask in front of said slit thereby to expose successive groups of said elements to said collimated beam.

3. Method for detecting defect in a photomask consisting of supposedly identical circuit elements having rectilinear geometry and located at fixed center-to-center spacing in an X-Y array, comprising the steps of:

projecting a coherent collimated light beam onto substantially all elements of said photomask;

with a transform lens, focusing the light transmitted through said mask in the transform plane of said lens;

in said transform plane, interposing a spatial stop filter in the form of a cross consisting of a pair of opaque rectangular struts disposed substantially at right angles to each other, thereby to block the light diffracted by the characteristic rectilinearity of said elements, but to pass the light tracing to nonrectilinear defects in said elements;

detecting said passed light to produce an output; and utilizing said output to generate indicia of defects in said mask.

* * * * *